(12) United States Patent
Winner et al.

(10) Patent No.: US 6,580,385 B1
(45) Date of Patent: Jun. 17, 2003

(54) OBJECT DETECTION SYSTEM

(75) Inventors: Hermann Winner, Karlsruhe (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,620

(22) PCT Filed: May 25, 2000

(86) PCT No.: PCT/DE00/01667

§ 371 (c)(1),
(2), (4) Date: Apr. 2, 2001

(87) PCT Pub. No.: WO00/73818

PCT Pub. Date: Dec. 7, 2000

(30) Foreign Application Priority Data

May 26, 1999 (DE) ........................... 199 23 920
Jul. 23, 1999 (DE) ........................... 199 34 670

(51) Int. Cl.[7] ..................... B01S 13/00; B60T 7/16; B62D 1/24; G01C 3/08
(52) U.S. Cl. ................... 342/70; 180/169; 356/4.04
(58) Field of Search ................ 342/70, 71, 94, 342/110; 180/169; 356/4.04, 4.05

(56) References Cited

U.S. PATENT DOCUMENTS

| 4,716,298 A | * | 12/1987 | Etoh ........................... 250/561 |
| 5,754,123 A | | 5/1998 | Nashif et al. |
| 5,872,536 A | | 2/1999 | Lyons et al. |
| 5,933,109 A | * | 8/1999 | Tohya et al. ................. 342/175 |
| RE36,470 E | * | 12/1999 | Woll et al. .................... 342/71 |
| 6,061,001 A | * | 5/2000 | Sugimoto ................... 340/903 |
| 6,085,151 A | * | 7/2000 | Farmer et al. ............. 701/301 |
| 6,107,956 A | * | 8/2000 | Russell et al. ............... 342/70 |
| 6,204,755 B1 | * | 3/2001 | Kikuchi ..................... 340/435 |
| 6,275,772 B1 | * | 8/2001 | Sugimoto et al. .......... 701/301 |
| 6,311,123 B1 | * | 10/2001 | Nakamura et al. ........... 701/96 |
| 6,335,700 B1 | * | 1/2002 | Ashihara ..................... 342/70 |

FOREIGN PATENT DOCUMENTS

| DE | 41 10 132 | 10/1991 |
| DE | 42 35 619 | 4/1993 |
| DE | 42 09 536 | 9/1993 |
| DE | 43 30 476 | 3/1994 |
| DE | 195 18 978 | 11/1995 |
| DE | 195 30 065 | 1/1997 |
| DE | 197 13 826 | 10/1997 |
| DE | 196 22 777 | 12/1997 |
| DE | 197 24 496 | 12/1997 |
| EP | 0 544 468 | 6/1993 |
| EP | 0 575 814 | 12/1993 |
| JP | 359035163 A | * 2/1984 ............ G01S/3/78 |

* cited by examiner

Primary Examiner—Thomas H. Tarcza
Assistant Examiner—Brian K Andrea
(74) Attorney, Agent, or Firm—Kenyon & Kenyon

(57) ABSTRACT

An object detection system, in particular for a motor vehicle, is described where the object detection system is a combination of at least three object detectors, each having a different detection zone and/or a different detection range.

4 Claims, 3 Drawing Sheets

OBJECT DETECTION SYSTEM

FIELD OF THE INVENTION

The present invention relates to an object detection system. Such a system may be used, for example, as part of an adaptive cruise control in a motor vehicle. Such a control can regulate a previously set driving speed and/or a previously set distance from a vehicle in front or from objects in the direction of travel without intervention by the driver. This is done with appropriate regard for the environment around the motor vehicle and optionally additional parameters such as visibility and weather conditions. Such a control is known as an adaptive cruise control system (ACC system). The ACC system must be flexible enough to react appropriately to all driving situations, especially in view of today's growing traffic density. This in turn requires an appropriate object detection sensor system to supply the measured data required for control purposes in all driving situations.

BACKGROUND INFORMATION

A plurality of different technical concepts/systems are available for object detection; some of these are described in greater detail below.

German Published Patent Application No. 43 30 476 discloses an optical radar system for a motor vehicle. This radar system contains essentially a light emitting unit for emitting light in the direction of a target object and a light receiving unit for receiving the light reflected by the target object. The light receiving unit contains a condenser lens, which is arranged to capture the reflected light, and a light-sensitive element arranged in an offset position relative to a focal point of the condenser lens by a preselected distance in an imaging space so it is exposed to light propagating from the condenser lens to ensure a narrower detection zone for a remote target object and a wider detection zone for a nearby target object. In other words, in order to ensure a narrower detection zone for a remote target object and a wider detection zone for a nearby target object, a first and second light-sensitive element are arranged in appropriate positions in an imaging space of a first and second condenser lens. Such an optical radar system based on light emission and light reception is also referred to below as a LIDAR (light detection and ranging) sensor.

German Published Patent Application No. 197 13 826 describes a radar device and a vehicle safety distance control system using this radar device. This radar device has a rotating polygonal mirror having a plurality of mirror surfaces inclined at different angles. A semiconductor laser diode and a collimator lens are arranged above the polygonal mirror. An infrared pulsed beam emitted by the laser diode is reflected by a reflective mirror arranged at an upper location in front of the polygonal mirror to reflect the pulsed beam downward obliquely toward the rotating polygonal mirror in such a way that the pulsed beam is reflected as a transmitted beam traveling toward a measurement zone in a forward direction. A light receiving device receives the transmitted beam returning from an object inside the measurement zone. Due to the use of a rotating polygonal mirror, two-dimensional scanning in the forward direction is possible, so that the pulsed beam can be swiveled horizontally due to the rotation of the polygonal mirror, and the pulsed beam can be swiveled vertically due to the faces of the polygonal mirror inclined at different angles. On the basis of the time between transmission of the pulsed beam and reception of the reflected beam, a calculation circuit determines a distance, an angle and a speed relative to a vehicle traveling in front that has been detected.

Such a radar device based on light is also referred to below as a LIDAR sensor.

German Published Patent Application No. 195 30 065 describes a monostatic FMCW radar sensor for a motor vehicle for detecting objects. In the case of this radar sensor, high frequency microwave beams (in the range of approx. 76 to 77 GHz) are sent out over antenna feeds designed for both sending and receiving a corresponding echo signal. The beams are concentrated by upright dielectric emitters located in the path of the beam and focused by a dielectric lens. Millimeter waves are generated by a Gunn oscillator driven by a stabilization network which contains a linearization network having a frequency regulator. Millimeter waves generated in this way are sent over conductors to parallel rat-race rings and from there are beamed over antenna feeds. Millimeter waves reflected by a possible target object are sent through the antenna feeds, the rat-race rings and ring mixers, for further signal processing. A portion of the energy of the Gunn oscillator is branched off by the ring mixer and mixed down. For further signal processing, each reception channel has a separate analyzer containing an amplifier, a low-pass filter, a downstream weighting filter and an A/D converter. The signals obtained after A/D conversion are analyzed using fast Fourier transform. An FMCW radar sensor designed accordingly has a range of approx. 150 meters and is preferably used in a vehicle for detection of one or more objects in a vehicle.

Such an FMCW radar sensor is also referred to below as an ACC (adaptive cruise control) radar sensor or simply an ACC sensor.

German Published Patent Application No. 197 24 496 discloses an obstacle detection device and a passenger safety device which utilizing the obstacle detection device. The obstacle detection device determines the distance between an obstacle and a vehicle by means of two distance measuring sensors, and it includes an impact angle calculating device, which calculates a plurality of positions of the obstacle by triangulation on the basis of the distance information provided by the two distance measuring sensors. Furthermore, the location of the obstacle, which is calculated by means of the plurality of calculated positions of the obstacle, is used to determine the impact angle formed by the obstacle and the vehicle. The two distance measuring sensors used are designed as radar sensors mounted on the right and left of the front part of a motor vehicle. The relevant distance measuring range of the sensors is in the range of less than a meter.

Such an obstacle detecting device is also referred to below as a precrash sensor or as a short-range radar.

U.S. Pat. No. 5,872,536 describes a multi-sensor object detection system which determines the instantaneous distance, relative velocity, collision angle and point of impact of a colliding object. This system has a plurality of signal transmitters which monitor a predetermined area within a certain angle range. Each signal transmitter emits a modulated carrier wave and receives the corresponding modulated carrier wave reflected by an object. The distance of the object from each individual signal transmitter is determined from the reflected signals on the basis of the amplitudes of the harmonic components of the reflected signal by using the Doppler effect. The instantaneous relative velocity relative to the object is determined on the basis of the frequencies of the harmonic components of the reflected signal. An impact detecting unit determines on the basis of the distance and relative velocity data whether there will be a collision, and if so, where the point of impact will be and at which angle the collision will occur.

A preferred embodiment provides for the use of two signal transmitters operating in a frequency range of 5.8 GHz. The maximum range of the sensor system is 3 meters, an especially sensitive range being up to approx. 1.5 meters. Such a sensor system is also referred to below as a precrash sensor or short-range radar.

German Published Patent 42 36 619 describes a distance determining device for automobiles which is equipped with an imaging and image recording system for imaging objects at a predetermined zone outside the automobile. This distance determining system is provided with a stereoscopic optical system and has a stereoscopic image processing device for processing the images produced by the optical system to calculate three-dimensional distance data. This system is capable of detecting a possible obstacle and the shape of the road in a distance range between 2 meters and 100 meters if the system is arranged in the upper area behind the windshield. The stereoscopic optical system includes cameras using solid-state imaging elements such as a CCD (charge coupled device). Thus, on the whole there are four CCD cameras in the system, two for observing short distances and two for observing long distances.

Such a distance determining device is also referred to below as a stereoscopic camera.

German Published Patent No. 42 09 536 describes an imaging cell for an image recording chip. A plurality of imaging cells is arranged in the form of a two-dimensional array. An analyzer logic circuit which is provided is designed for mapping high input signal dynamics on high output signal dynamics. The light-sensitive element of the imaging cell has two MOS transistors with which compression of the input signal dynamics and amplification of the output signal can be regulated. Such an image sensor can be used in the visible spectral range in particular.

Such an arrangement of imaging cells is also referred to below as a CMOS camera.

German Published Patent Application No. 41 10 132 describes a sensor system for automatic determination of the relative position between two objects. This sensor system has a combination of an angle-dependent sensor and an angle-independent sensor. The sensor which does not have angle resolution and is thus independent of angle is designed as a sensor that analyzes the distance from an object on the basis of a transit time measurement. Possible sensors include RADAR, LIDAR or ultrasonic sensors. The angle-dependent sensor has a geometric arrangement of optoelectronic transmitters and receivers arranged in the form of photoelectric barriers. The sensors, both of which cover a common detection zone, are arranged in close spatial proximity. To determine the relative position of an object, the distance from the object is determined by the angle-independent sensor, and the angle to the object is determined by the sensor having angle resolution. To determine a position relative to the object, the distance from the object is determined by the angle-independent sensor, and the angle to the object is determined by the sensor having angle resolution. The relative position is known on the basis of the distance from and the angle to the object. As an alternative to this arrangement of optoelectronic transmitters and receivers, the use of two sensors is proposed, which jointly determine the angle to the object by the triangulation principle.

German Published Patent Application No. 196 22 777 describes a vehicle distance controller which controls the throttle actuator of a vehicle, the brake actuator of the vehicle and an alarm device in the vehicle by a control unit. This control unit receives as input data the vehicle velocity and the data from two range locators and a tracking range locator. The two range locators are designed as optical range locators which emit light onto an object and detect the light reflected by the object. Types which operate according to the transit time or triangulation principle are provided. The two range locators are mounted on the two outer sides of the front of the vehicle and monitor the lane in front of the vehicle for vehicles cutting in from adjacent lanes. The tracking range locator has a pair of optical lenses arranged in parallel and image sensors arranged behind the respective lenses. The tracking range locator is used to observe another vehicle traveling in front in the same lane and select it for the vehicle distance control. If one of the two range locators detects a vehicle cutting into the lane during controlled operation, the alarm device is activated. This publication thus represents a combination of LIDAR sensors with a stereoscopic camera.

German Published Patent Application No. 195 18 978 describes an obstacle detection system for motor vehicles which can also determine the width and height of the obstacle in addition to its distance. The distance from an object in front of the motor vehicle and the width of the object are detected by a laser radar distance measuring unit. In the case of an optical imaging unit composed of a vertically mounted stereo video camera device, a suitable window is selected on the basis of the distance information supplied by the laser radar distance measuring unit. Knowing the previously determined distance information, it is possible as part of image analysis to determine the size and thus also the height of the object detected. For the case when an error occurs either in the laser radar distance measuring unit or in the stereo video camera unit, it is at least possible to still determine the information with regard to the distance from the object or obstacle. This publication thus presents a combination of a LIDAR sensor with a stereoscopic camera.

SUMMARY OF THE INVENTION

The object of the present invention is to provide an object detection system which is capable of accurately and reliably detecting objects in a detection zone that is as large as possible.

This object is achieved by the fact that the object detection system is made up of a combination of at least three object detectors, each having a different detection zone and/or a different detection range. This has the advantage that the optimum object detector Summary of the Invention. Objects can be detected especially reliably and accurately due to this measure.

In the case of an object detection system which is used in particular for a system for adaptive cruise control (ACC system) in a motor vehicle, it is advantageous that the detection zones lie mainly in the direction of travel in front of the motor vehicle, and that the detection zones overlap. It is especially advantageous if the maximum detection range of the object detector having the greatest detection range is at least about 100 meters, and if the detection range of the object detector having the smallest detection range begins at about less than one meter. It is also advantageous that the detection zone of the object detector having the greatest detection range has a detection width in at least portions of the detection zone which permits detection of objects in lanes adjacent to that of one's own vehicle. With respect to the detection zone of the object detector having the smallest detection range, it is advantageous if it has a detection width corresponding at least to the width of one's own vehicle. This ensures that the required detection width will be monitored in any detection zone.

It is especially advantageous that the object detectors operate according to at least two different technical concepts. Preferably at least one of the following is used as the technical concept:

1. Object detection based on acoustic signals, in particular ultrasound.
2. Object detection based on electromagnetic microwave radiation, in particular FMCW radar and/or pulsed radar.
3. Object detection based on image analysis, in particular a stereoscopic camera and/or a CMOS camera.
4. Object detection based on bundled light, in particular a LIDAR sensor.

In an embodiment of the present invention precisely three detection zones can be differentiated. In this case, an object detector based on electromagnetic microwave radiation is used in the first detection zone, while an object detector based on optical radiation and/or image analysis is used in the second detection zone. Then an object detector based on electromagnetic microwave radiation is used in the third detection zone. This specific object detector arrangement combines in a special manner the advantages of the individual types of object detectors. In the case of this arrangement, it is advantageous that the first object detector has a detection range of approx. 0.5 meter to approx. 7 meters. The second object detector has a detection range of approx. 2 meters to approx. 40 meters, and the third object detector has a detection range of more than approx. 40 meters. In the case of this arrangement, the first and second detection zones overlap by approx. 5 meters in an especially advantageous manner. The second and third detection zones also overlap. The resulting overlapping of the detection zones can be utilized so that the measured values originating from these zones can be used for separate analyses. These separate analyses may include, for example, joint tracking of the objects detected in the overlap zone and/or function monitoring of the object detectors and/or plausibility check of the measured data.

It is also advantageous that the object detectors are used for at least one additional application. This may be as a parking aid, for precrash detection, for start monitoring, to detect the condition or surface of the roadway, to recognize traffic signs, to recognize or determine the range of visibility, for adaptive light distribution, for headlight adjustment or for weather detection or as a rain sensor. This has the advantage that other additional sensors for these applications can be omitted.

It is advantageous to use the object detection system as part of a system for adaptive cruise control, the system being capable of continuously regulating the speed between standstill and the maximum speed of the motor vehicle. This adaptive cruise control, which has been expanded by adding this stop-and-go functionality, is an application of the object detection system according to the present invention.

DETAILED DESCRIPTION

Figure 1:
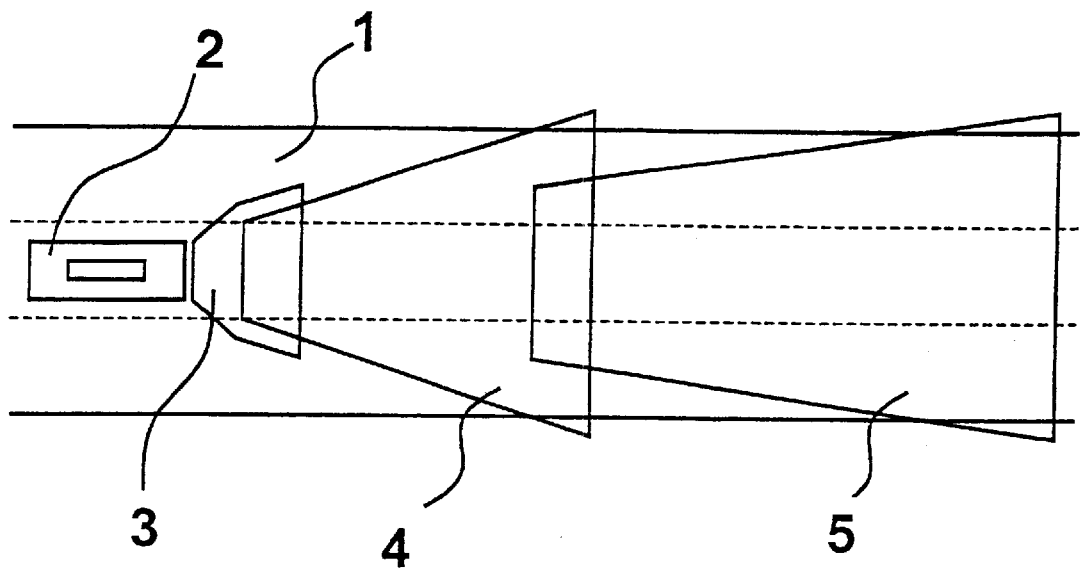
FIG. 1 shows a motor vehicle equipped with the object detection system according to an embodiment of the present invention.

FIG. 1 shows a multi-lane road 1 on which a motor vehicle 2 is traveling. Motor vehicle 2 is equipped with an object detection system according to the present invention. The object detection system presented as part of this embodiment has a combination of three object detectors, each having a different detection zone, with the detection zones partially overlapping. The detection zones in front of the vehicle in the direction of travel are labeled as 3, 4 and 5. The overlap between zones 3 and 4 and between zones 4 and 5 can be clearly seen. In addition, it can also be clearly seen that each detection zone 3, 4 and 5 has a detection width at least corresponding to the width of vehicle 2. Detection zones 4 and 5 detect the lanes adjacent to one's own vehicle 2 in certain areas. It is also easy to see that all three detection zones 3, 4 and 5 have different divergence angles. The smaller the detection range of a detection zone, the greater is the divergence angle of the corresponding detection zone. The first detection zone 3 has the largest divergence angle and is thus capable of providing broad detection coverage directly in front of vehicle 2. The object detector of this first detection zone 3 has a detection range beginning directly in front of the motor vehicle and extending for approx. 7 meters in the direction of travel. The object detector used in this zone has a short-range radar based on electromagnetic microwave radiation, for example, as described in the acknowledgment of the prior art. In particular, when the short-range radar should have a large detection width immediately in front of vehicle 2, it may be necessary to mount more than one short-range radar on the front of vehicle 2. In addition to being used in combination with the other object detectors to form an object detection system, this object detector may also be used for other applications such as a parking aid, precrash detection or start monitoring. The second detection zone 4 presented in this embodiment may be, for example, an object detector based on optical radiation and/or image analysis. A possible object detector based on optical radiation or laser radiation may be a LIDAR sensor such as that described in the acknowledgment of the prior art. This LIDAR sensor, which covers a detection zone of approx. 2 meters up to 40 meters, has especially sharp lateral and vertical detection of the objects to be detected in this zone. This is due to the strongly bundled light beam of such a system. If using infrared beams, for example, bundling of less than 10 is possible. Such a LIDAR sensor offers the additional advantage that it can also be used to determine the range of visibility or to detect the weather or as a rain sensor, for example. The prerequisite for the possibility of determining the range of visibility is that the LIDAR sensor be capable of performing a measurement of the spectra of the reflected beam of light. As an alternative or in addition to the LIDAR sensor described above for detection zone 4, a stereoscopic camera and/or a CMOS camera may also be used for this zone, such as that described in the acknowledgment of the prior art. In particular in conjunction with a system for adaptive cruise control (ACC system), such a camera offers the advantage that an improved object classification is possible. In addition, this camera offers the advantage that lane detection can also be performed in parallel with the object classification. In this way, a detected object that is stored in the memory may be provided with the attribute "in the vehicle's own lane" or "not in the vehicle's own lane," which offers advantages in further processing/ analysis of object data. In addition to being used for recognition of traffic signs, as a visibility sensor, for adaptive light distribution (ALV) or in combination with or instead of an angle of pitch sensor, such a camera can also be used for headlight beam width or height adjustment. The proposed detectors for this second detection zone 4 are subject to some degree of influence by external factors such as fog, rain or snow, because they depend on visibility. For this reason, an object detector that does not depend on these factors is recommended for the third detection zone 5 in particular, because the effects of external factors increase greatly with an increase in the distance from one's own vehicle 2. A radar sensor such as that known for adaptive cruise control (ACC), for example, and as described in the acknowledgment of the prior art may be used for this purpose. This ACC radar sensor has a detection zone having a range of up to 150 meters and a detection width of up to three lanes or more in at least some parts of the detection zone. In general, the detection width of an ACC radar system depends on the distance and usually spreads out in a fan shape starting from the ACC radar sensor. Such an ACC radar system usually operates in a frequency range of approx. 77 GHz. The transition range between detection zones 4 and 5 is at approx. 40 meters in this embodiment. However, overlapping is also possible, with the individual detection zones having a larger and/or smaller overlap zone. A corresponding embodiment is described in conjunction with the explanation of FIG. 4. FIG. 1 thus illustrates an object detection system covering a detection zone up to 150 meters long with a width of up to three lanes due to the combination of three object detectors according to the present invention.

Figure 2:
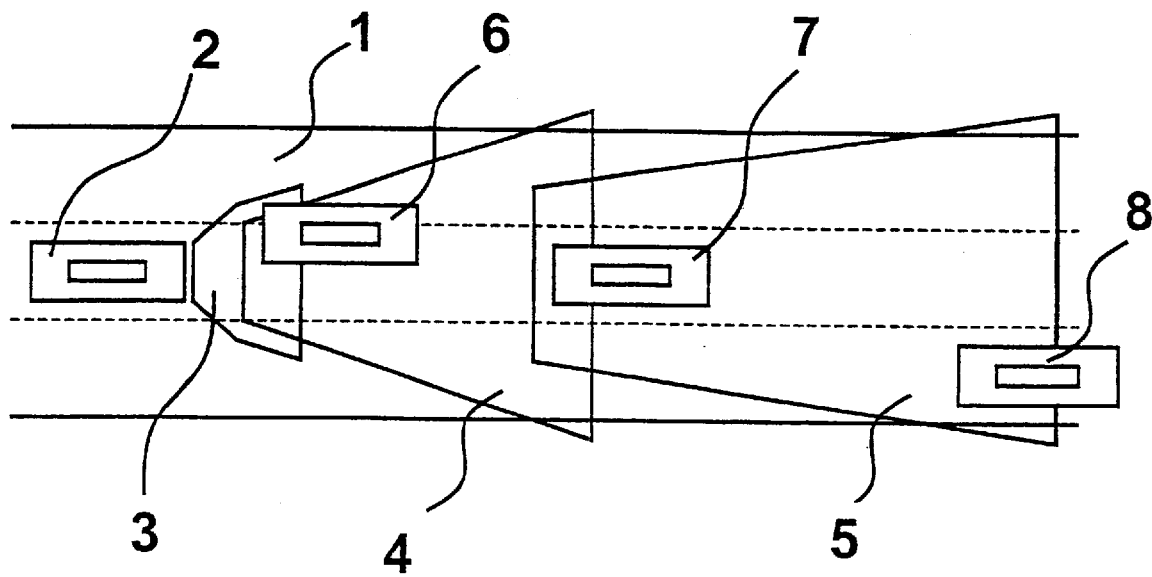
FIG. 2 shows the same vehicle having the object detection system, and also shows exemplary detected objects.

FIG. 2 also shows a multi-lane road 1, a vehicle 2 having an object detection system according to the present invention and a first detection zone 3, a second detection zone 4 and a third detection zone 5. In addition, FIG. 2 in comparison with FIG. 1 also shows three possible target objects 6, 7 and 8, i.e., motor vehicles in this embodiment. In general, however, the object detection system is capable of detecting a wide variety of moving and/or stationary targets. In inner city traffic, these may also be pedestrians and/or cyclists entering or crossing road 1 in front of vehicle 2. In the present driving situation, vehicle 6 is detected by first detection zone 3 and second detection zone 4. The second vehicle 7 is detected by detection zones 4 and 5, while vehicle 8 is detected only by detection zone 5.

For example, if only vehicle 8 were present on the road, the object detection system according to the present invention would make it possible to ascertain that vehicle 8 is in a lane adjacent to the lane of vehicle 2. When using a stereoscopic camera system and/or a CMOS camera, for example, this can be accomplished by lane detection of up to approx. 50 meters with subsequent lane extrapolation. Likewise, detection of the edge of the lane based on information supplied by the ACC radar sensor would also be possible for lane detection. In addition, projection of one's own driving tube to also analyze a rotational rate sensor and additional supporting sensor systems, for example, in addition to the data of the object detectors, would also be possible. One's own projected driving tube here then usually corresponds to one's own lane ahead. Vehicle 8 would thus have no effect on the control of one's own vehicle 2, and vehicle 2 would continue to travel unhindered. In the case of a system for adaptive cruise control (ACC system), this would result in one's own vehicle 2 being accelerated to the desired speed preselected by the driver.

For example, if vehicle 7 were the only target object on the road in front of one's own vehicle 2, the object detection system would detect that this vehicle 7 is in the vehicle's own lane ahead. In the case of a system for adaptive cruise control (ACC), for example, this would result in vehicle 7 being selected as the target object for control purposes. The system for adaptive cruise control (ACC) would automatically cause vehicle 2 to slow down if one's own vehicle 2 approaches vehicle 7 too rapidly or too closely. It would use the automatic control of adaptive cruise control (ACC), which would keep vehicle 2 a safe distance behind vehicle 7. For the case when vehicle 7 is moving forward more rapidly than one's own vehicle 2, one's own vehicle 2 would automatically be accelerated to the desired speed preselected by the driver. This last operating situation corresponds to the cruise control function.

If only vehicle 6 were present on the road ahead, it would be detected by detection zones 3 and 4. If this vehicle 6 were to brake suddenly for no apparent reason, the short-range radar used in this detection zone would immediately detect this risk for vehicle 2. If short-range radar detects that a collision with vehicle 6 appears to be unavoidable, a pre-crash signal would be delivered by this short-range radar. This signal can be used to initiate measures in vehicle 2 to prepare vehicle 2 for the impending crash. This might include, for example, tightening the seat belts and/or preparing for deployment of the airbag(s).

Whenever a target object is in the overlap zone of two detection zones, as is the case in FIG. 2 with vehicle 6 between detection zones 3 and 4 and vehicle 7 between detection zones 4 and 5, the redundant measured values supplied from this overlap zone can be used for separate analyses, including primarily joint tracking of the detected objects in the overlap zone. This joint tracking offers functional advantages in operation, such as an increase in measurement accuracy or detection reliability. Since measurement failures may occur with an object detector under some circumstances, but it is less likely that two object detectors will have a measurement failure at the same time, detection reliability can thus be increased by the redundant data from two object detectors. Another advantage of joint tracking is a faster and more reliable transfer of an observed target object from one detection zone to the next in analyzing the data from the object detectors. It is also possible to monitor the function of the object detectors on the basis of these measured values and/or to check the measured data for plausibility. In this case, it is possible to check on the extent to which the measured data from the different object detectors match and whether a possible misadjustment and/or failure and/or soiling of the object detection system can be detected. The measured data may optionally be used for adjustment and/or calibration of an object detector.

The object detection system according to the present invention can preferably be used in particular with regard to future function expansions as part of a system for adaptive cruise control such as stop-and-go functionality. In this case, the system must be capable of controlling the speed continuously between standstill and the maximum speed of the vehicle. This adaptive cruise control system which has been expanded to add the stop-and-go functionality (stop-and-go system) is a further development not offered by most systems today. Instead, today's systems are automatically deactivated in a speed range below 30 km/hr, for example. The expanded stop-and-go functionality requires a response of the system to stationary objects, a rapid response to vehicles cutting in to one's own lane in heavy traffic and the possibility of automatic speed reduction down to a complete stop of one's own vehicle. Another possible function of a stop-and-go system is the "conditional go" where the driver of a stopped vehicle receives notice that a vehicle stopped in front of him has started up. If the driver triggers a corresponding operation on the basis of this notice (e.g., by means of an operating lever or speech input such as "go"), one's own vehicle can start up automatically.

Figure 3:
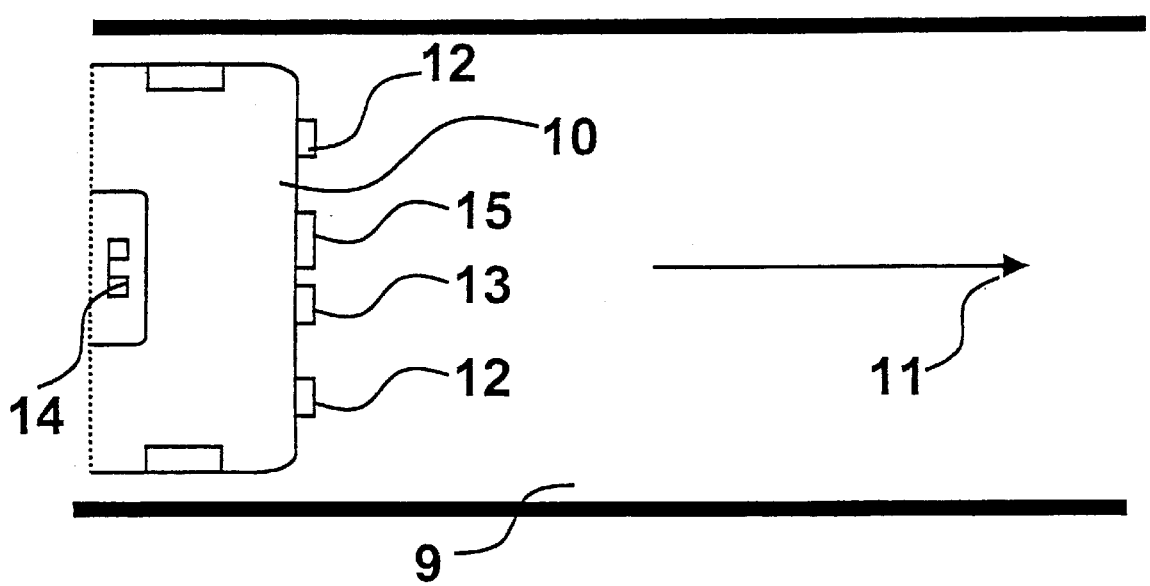
FIG. 3 shows a possible arrangement of the individual object detectors in the front area of the motor vehicle.

FIG. 3 illustrates one possible arrangement of the individual object detectors of the object detection system, showing a road 9 with a vehicle 10 traveling on it in direction 11. The object detectors used in this embodiment include a short-range radar 12, a LIDAR sensor 13, a stereoscopic camera and/or a CMOS camera 14 and an ACC radar sensor 15. In this embodiment, short-range radar 12 is composed of a two-part sensor system to have the full detection width even at a short distance in front of one's own vehicle 10. As shown in FIG. 3, stereoscopic camera 14 may be mounted in an elevated position in the interior of the vehicle, e.g., behind the internal rearview mirror.

Under the assumption that an object detector which still supplies measured values of sufficient accuracy even at this short distance is used for detection zone 16, this increased redundancy of the detection zones in comparison with FIG. 1 offers all the advantages mentioned above as part of the previous description.

Figure 4:
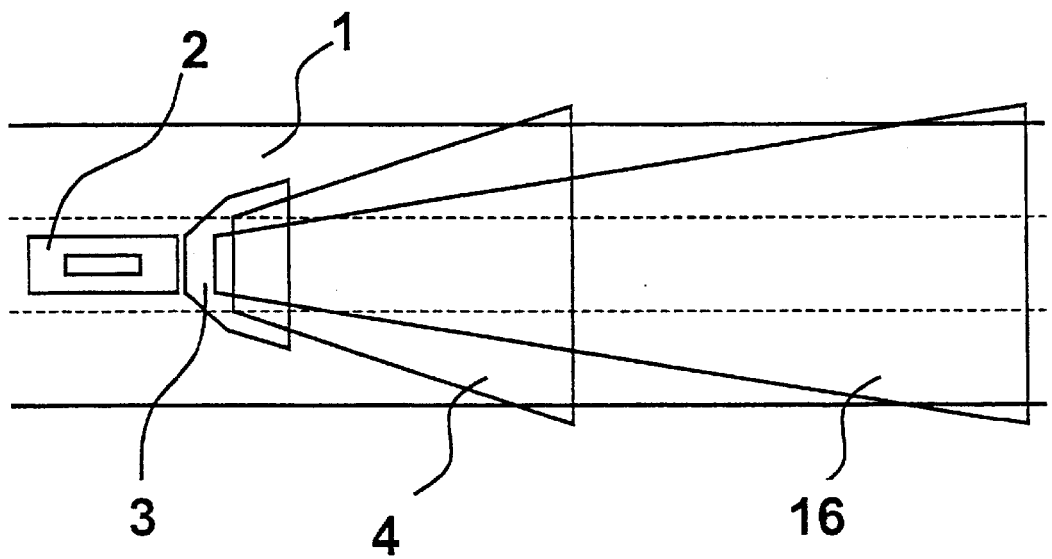
FIG. 4 shows a motor vehicle equipped with another embodiment of the object detection system according to the present invention.
Figure 5:
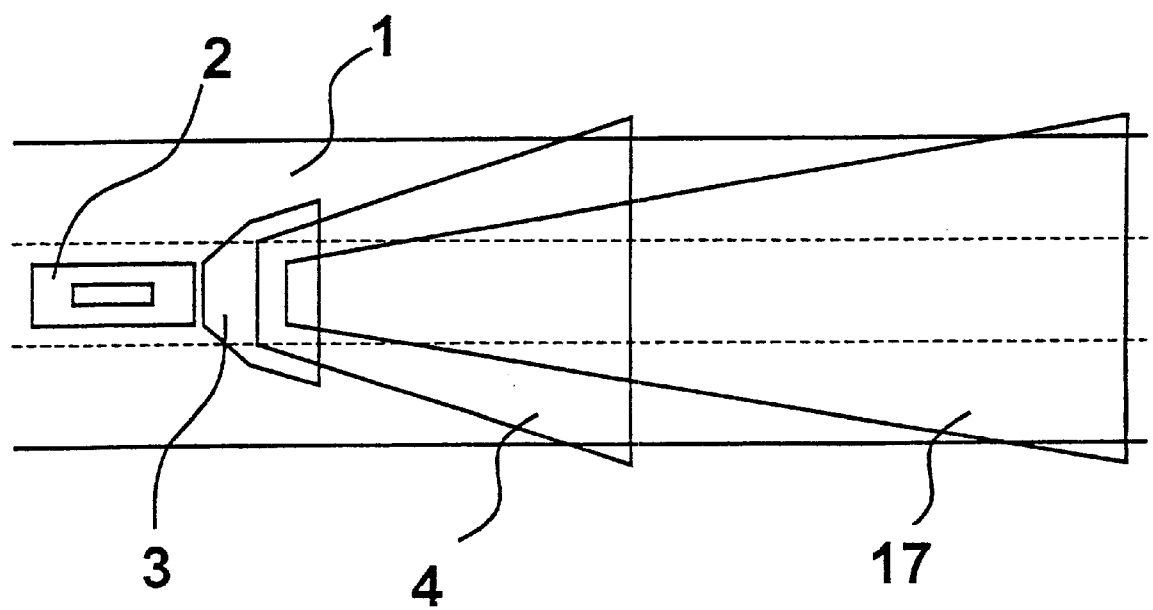
FIG. 5 shows a motor vehicle equipped with another embodiment of the object detection system according to the present invention.

FIG. 5 shows a vehicle 2 equipped with another embodiment of the object detection system according to the present invention. As in FIGS. 1 and 4, a vehicle 2 is traveling here on a multi-lane road 1. Vehicle 2 is equipped with an object detection system according to the present invention. Detection zones 3 and 4 are identical to detection zones 3 and 4 illustrated in FIGS. 1 and 4. In contrast with the embodiment illustrated in FIGS. 1 and 4, detection zone 17 of the object detector having the greatest detection range is a different one in this embodiment. It can be seen clearly that detection zone 17 has the same maximum detection range as detection zone 5 from FIG. 1 and detection zone 16 from FIG. 4. However, detection zone 17 does not begin at such a short distance in front of vehicle 2 as detection zone 16 according to FIG. 4. As a result, detection zone 17 overlaps with detection zone 4 and protrudes partially into detection zone 3.

In general, any desired overlap options for the different detection zones are within the scope of the object detection system according to the present invention. In addition, it is also within the scope of the object detection system according to the present invention for the number of detection zones to be increased or decreased. Those skilled in the art can make these choices according to the specific requirements of the respective object detection system. Equally possible is any desired combination of different object detectors within one detection zone. This choice is also left up to those skilled in the art.

In the embodiment according to FIG. 1 (detection zones 3, 4 and 5), that according to FIG. 4 (detection zones 3, 4 and 16) and that according to FIG. 5 (detection zones 3, 4 and 17), the entire detection zone of the object detection system is designed so that the relevant zones/parts of the lanes adjacent to one's own lane are observed at any distance from one's own vehicle.

In the entire present description, the detection zone of an object detector is to be understood as the detection zone that can be analyzed in a relevant manner by the measurement technology, as part of the physical detection zone of an object detector. From a purely physical standpoint, the limits of the detection zones of the object detector described here cannot be defined as sharply as indicated in the figures. However, the detection zones that can be analyzed in a relevant manner by the measurement technology used to perform the analysis can be delineated through suitable measures in the hardware and/or software of the object detection system according to the present invention, as is shown in the embodiments as an example.

What is claimed is:

1. An object detection system, comprising:

a combination of at least three object detectors, each of the at least three object detectors having at least one of a different detection zone and a different detection range, wherein each of the detection zones of the at least three object detectors is situated substantially in a direction of travel in front of the motor vehicle, each of the detection zones being overlapping, wherein the at least three-object detectors operate in accordance with at least two different detection techniques including at least one of an acoustic signal including ultrasound detection, an electromagnetic microwave radiation, an image analysis and bundled light, wherein a first of the at least three object detectors operates in accordance with the electromagnetic microwave radiation in a first detection zone, a second of the at least three object detectors operates in accordance with at least one of an optical radiation and the image analysis in the second detection zone, and a third of the at least three object detectors operates in accordance with the electromagnetic microwave radiation in a third detection zone.

2. The object detection system according to claim 1, wherein the detection range of the first object detector is approximately 0.5 m to 7 m, the detection range of the second object detector is approximately 2 m to 40 m, and the detection range of the third object detector is more than 40 m.

3. The object detection system according to claim 2, wherein measured values obtained by the at least three object detectors from the overlapping detection zones are used for separate analyses.

4. The object detection system according to claim 3, wherein the separate analyses include at least one of a joint tracking of detected objects in the overlapping detection zones, a function monitoring of the at least three object detectors, and a plausibility check of the measured values.

* * * * *

UNITED STATES PATENT AND TRADEMARK OFFICE
CERTIFICATE OF CORRECTION

PATENT NO. : 6,580,385 B1
DATED : June 17, 2003
INVENTOR(S) : Hermann Winner et al.

It is certified that error appears in the above-identified patent and that said Letters Patent is hereby corrected as shown below:

Colum 3,
Line 42, change "Application No. 41 10 132" to -- Application No. 196 22 777 --

Column 4,
Line 1, change "Application No. 196 22 777" to -- Application No. 41 10 132 --
Line 52, change "Summary of the Invention." to -- can be used for the individual detection zone for which it is best suited. --

Signed and Sealed this

Twenty-fifth Day of May, 2004

JON W. DUDAS
*Acting Director of the United States Patent and Trademark Office*